Aug. 23, 1932.   G. F. GIBSON   1,873,756
AUTOMATIC CHANGEABLE SIGN EXHIBITING MACHINE
Filed March 5, 1931   4 Sheets-Sheet 2
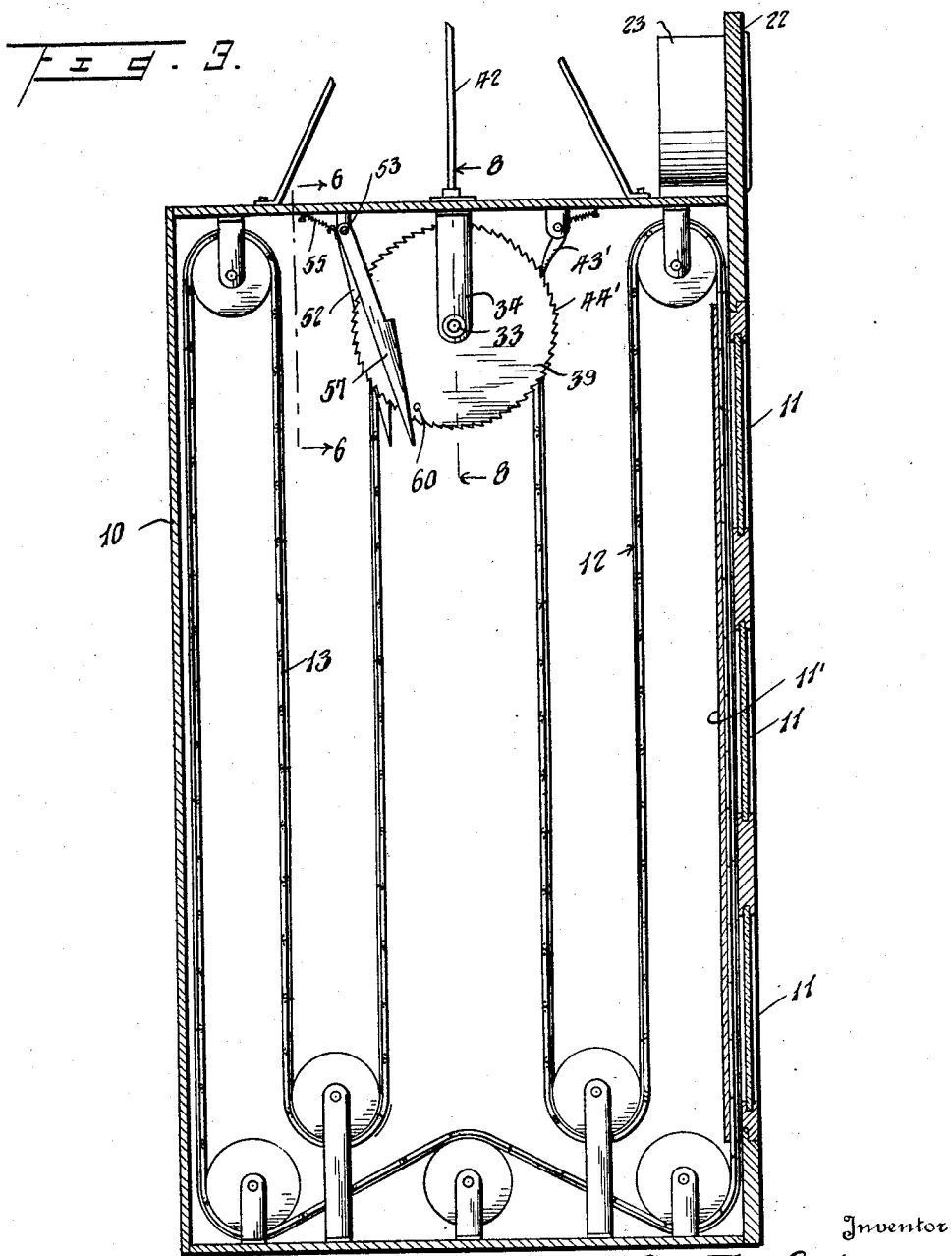

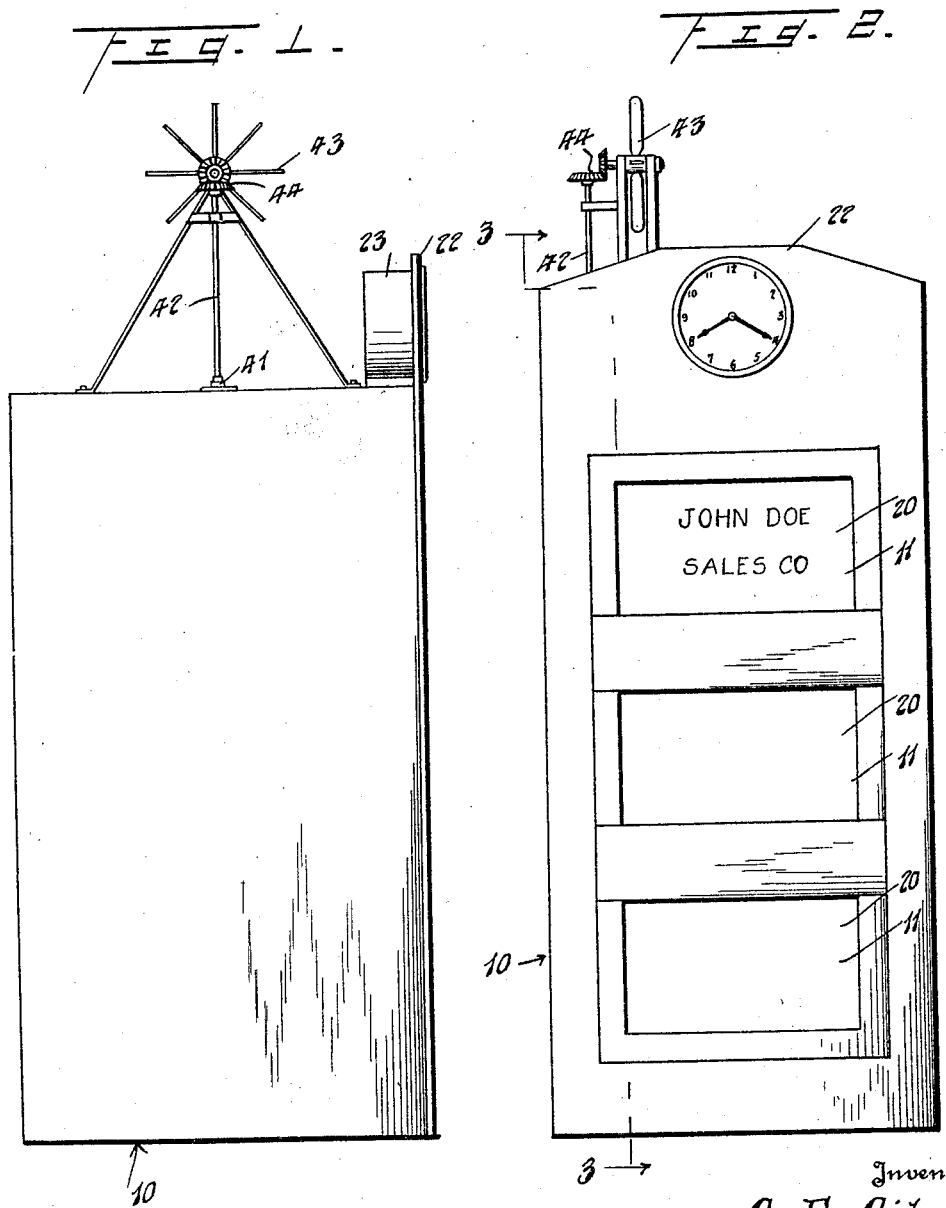

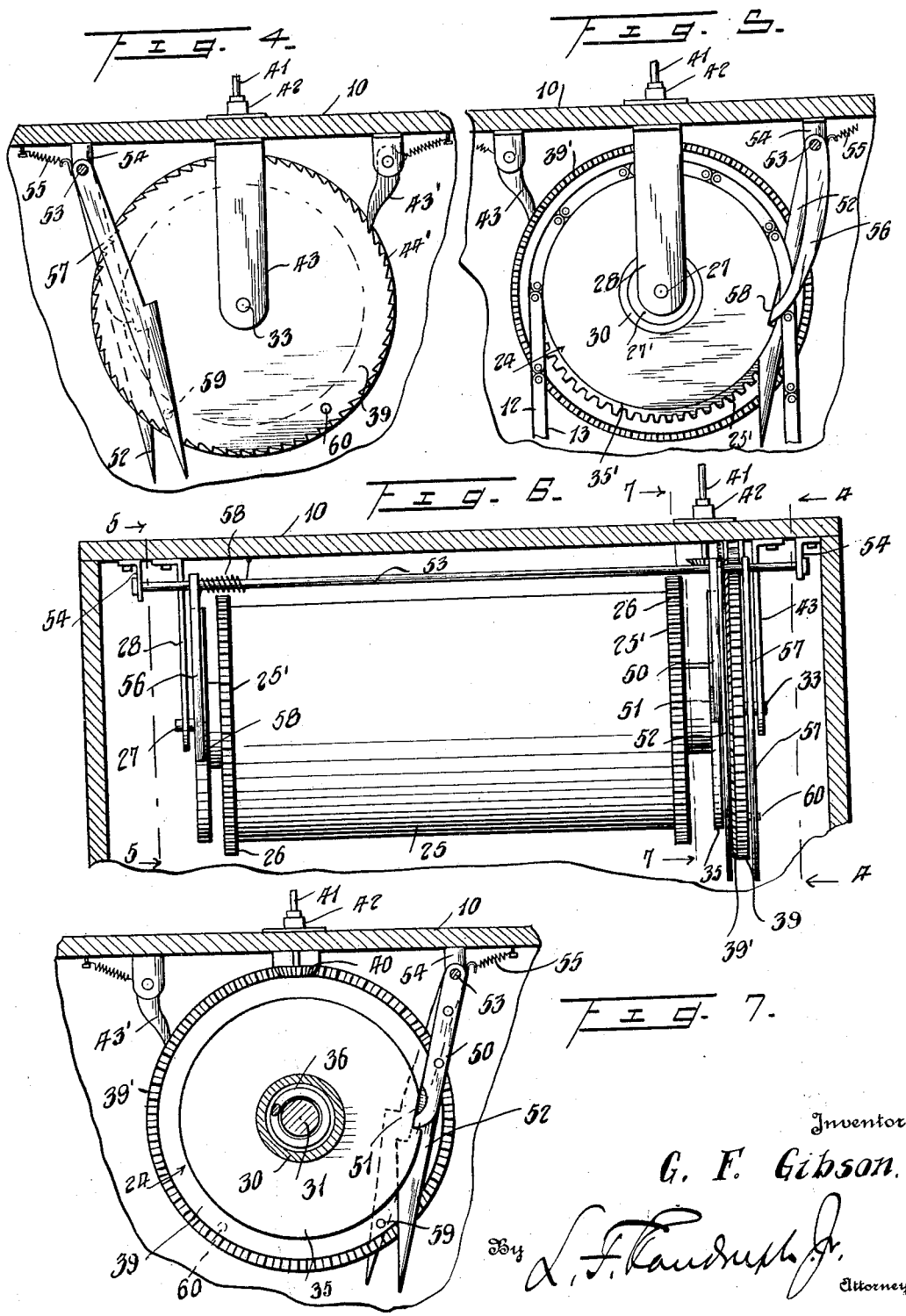

Aug. 23, 1932.　　　　G. F. GIBSON　　　　1,873,756
AUTOMATIC CHANGEABLE SIGN EXHIBITING MACHINE
Filed March 5, 1931　　　4 Sheets-Sheet 4
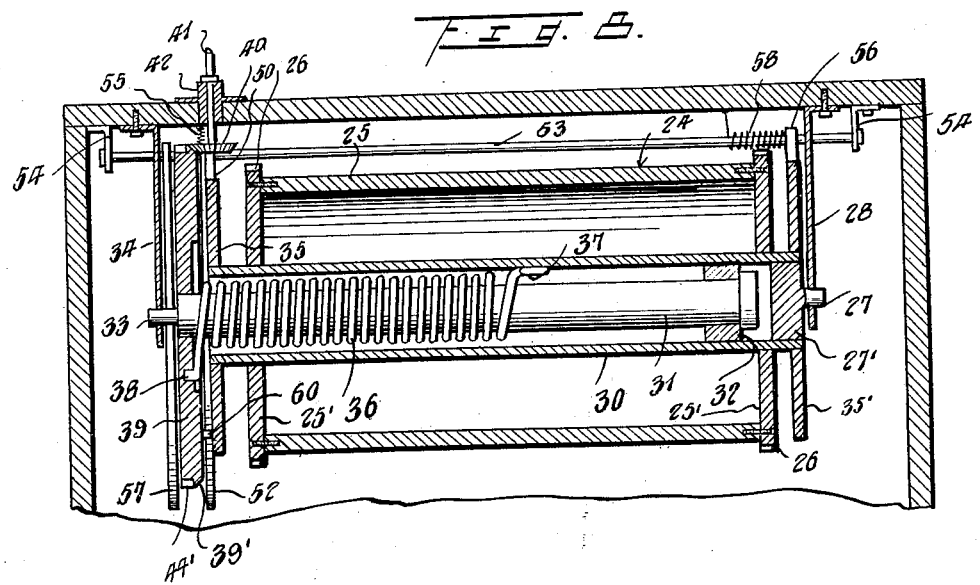
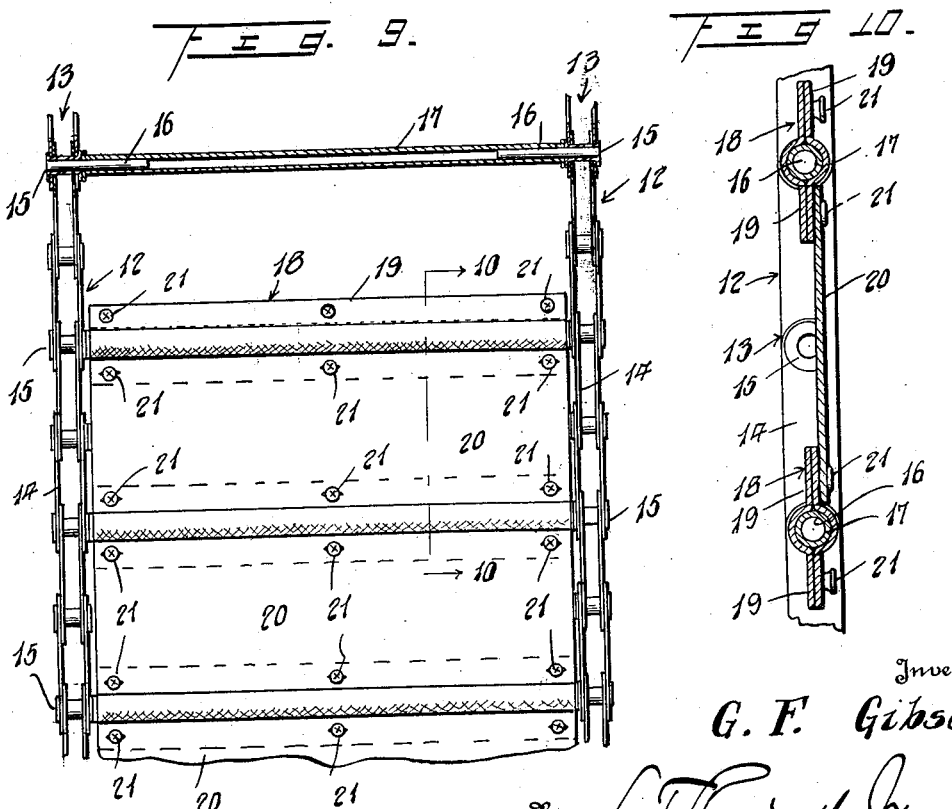
Inventor
G. F. Gibson.

Patented Aug. 23, 1932

1,873,756

UNITED STATES PATENT OFFICE

GRANVILLE F. GIBSON, OF SHREVEPORT, LOUISIANA

AUTOMATIC CHANGEABLE SIGN EXHIBITING MACHINE

Application filed March 5, 1931. Serial No. 520,385.

This invention relates to a sign and it is generally aimed to provide a novel construction whereby the same will operate substantially intermittently and automatically so as to afford an inexpensive medium for advertising or publicity for an individual or group.

Another object is to provide a novel construction wherein various signs may be used interchangeably.

The more specific objects and advantages will become apparent from a consideration of the description following taken in connection with accompanying drawings illustrating an operative embodiment, and wherein:—

Figure 1 is a view of the apparatus in side elevation,

Figure 2 is a front elevation of the apparatus,

Figure 3 is an enlarged vertical sectional view taken on the line 3—3 of Figure 2, looking in the direction of the arrows, Figures 4 and 5, respectively, are sectional views taken on the lines 4—4 and 5—5 of Figure 6, looking in the direction of the arrows, Figure 6 is a sectional view taken on the line 6—6 of Figure 3, looking in the direction of the arrows, Figure 7 is a sectional view taken on the line 7—7 of Figure 6, looking in the direction of the arrows, Figure 8 is a sectional view taken on the line 8—8 of Figure 3, looking in the direction of the arrows, Figure 9 is a detail elevation of the endless sign structure employed, and Figure 10 is a sectional view taken on the line 10—10 of Figure 9, looking in the direction of the arrows.

Referring specifically to the drawings, the various parts comprising the apparatus are mounted within or housed and protected by a casing generally designated 10 which is of any approved size, form or material.

At the front of the casing, a plurality of transparent windows such as 11 or a single one of them is provided as preferred. Said casing at the front wall has an upwardly projecting portion 22 which mounts a clock 23 which serves the function of drawing attention to the windows.

The apparatus is divided into three units, a description of whose structure and function follow, namely: a casing or housing (mentioned above), a spring motor and a conveyor.

The spring motor

As best shown in Figures 6 and 8 of the drawings, there is provided a driving element 24, including a spring motor consisting of a tube or sleeve 30, and mounting near each of its extremities and made fast thereto, by any suitable means, a sprocket wheel 26 having notches 25', and spanning the two sprocket wheels and made fast thereto is a cylindrical element 25 forming a drum.

Rigidly mounted on the two extremities of tube 30 are secured disks 35—35'. Within said tube 30 and made rigid thereto is a plug 27' which carries a trunnion 27. Through the other end of tube 30 there is passed a coiled spring 36 one end of which is made fast to the inner wall of tube 30 at 37. Through the coils of spring 36 is inserted a shaft 31 having a bearing 32 rigidly attached to tube 30. The outer end of shaft 31 carries a rigidly attached disk 39 with bevel gear teeth 39'. Shaft 31 also carries on its outward end a trunnion 33.

Spring 36 is made fast at its outward end to disk 39 as indicated at 38. Two brackets 28 and 34 made fast to casing or other stationary element serve as journals for trunnions 27 and 33.

Shaft 53 is carried by brackets 54—54 which are made fast to casing 10 or other stationary element. Rigidly mounted at one end of shaft 53 is dog 56 and at the other end of said shaft there are two levers 52 and 57. Lever 52 carries a detent 50 which forms a part thereof as shown in Figure 7. Lever 52 is pivotally mounted on shaft 53 and a contractile spring 55 normally urges it toward the axis of the drum. Lever 57 is rigidly fixed by means of set screw or other suitable means to shaft 53. A contractile spring 58 surrounding shaft 53 is made fast thereto at one end and at the other end to some stationary element whereby dog 56 and lever 57 are urged toward the axis of the drum.

On disk 35, Figure 7, there is a notch 51 which receives the free end of detent on lever 52 while disk 35' at the other end of tube 30 has a notch 58 which receives the free end of dog 56, the notch 51 being slightly in advance of notch 58.

A pawl or ratchet 43' conventionally spring pressed coacts with ratchet teeth 44' on the aforesaid disk 39 which prevents the unwinding of spring 36 when the winding power ceases as is the case sometimes with windmills.

There is a pin or lug 59 extending laterally from one side of disk 39 and a pin or lug 60 extending laterally from the other side of said disk.

*The conveyor*

The conveyor is composed of two sprocket chains 13 which are trained over sprocket wheels 24 and generally designated 12. Such chains 13 have spaced links 14 pivotally connected together by eyelets 15. At required distances, (in all cases equal to that of the circumference of the sprocket wheel 24) the eyelets have pins 16 passing therethrough loosely secured in place which engage tubes 17 loosely in order to mount them and which tubes span the chains 13. Sign mounting members 18 are pivotally mounted on tubes 17, the same comprising a pair of cloth or fabric sections 19 suitably connected together and centrally bulged to conform to the shape of the engaged tube 17.

Sign panels 20 of any appropriate material, for instance cloth or the like are adapted to be connected to mounting members 19 and to this end separable fastening means at 21 have been provided for securing opposite edge portions of each sign member 20 to the adjacent mounting members 19 as best shown in Figures 9 and 10.

Such signs 20 are adapted, through the actuation of the endless conveyor 12, to be displayed successively at the openings 11, three being displayed by way of example in the form of the apparatus illustrated. Such conveyor is operable within the casing and across the windows 11, preferably in a downward direction.

The apparatus is operable by any known motive power and its attachment thereto may be made by any known and defined means suitable for the occasion.

To illustrate the case in hand a windmill 43 is mounted on top of the casing. Operation of the windmill or any other type of motor at 43 causes rotation of shaft 42 and through the gearing 39 and 40 causes a rotation of disk 39 thereby winding the spring motor or placing spring 36 under tension, the drum 25 being held stationary by detent 50 on lever 52. As the disk 39 is rotated in this way, the pin 59 eventually engages the lever 52, forcing the same outwardly against the tension of spring 55 and causing the detent 50 to disengage the notch 51, whereupon the tensioned spring 36 rotates the drum 25. Such rotation, however, is slight since the dog 56 will engage the notch 58 at the other end of the drum, thus constituting another depression of said drum, the detent 50 at this time being inutile.

Further operation of the disk 39 causes pin 60, which is slightly in the rear of pin 59, to engage lever 57, forcing it outwardly thereby rocking shaft 53 and dog 56 against the tension of spring 58, particularly the dog 56 out of engagement with notch 58' whereupon drum 25 can turn to the extent of substantially a complete revolution, its movement being arrested by the re-engagement of detent 50 on lever 52 with notch 51.

From this stage the operation of winding and releasing of the motor is repeated.

With each revolution of the drum 25 the conveyor 12 is carried forward a distance equal to that of the circumference of the sprocket wheel 24, and each window 11, in front wall of casing should correspond in height to this distance.

A suitable false back structure 11' is provided in the rear of windows 11 for cooperation with the sign panels 20 to prevent their being blown inwardly and being damaged during storms.

Each rotation of the drum 25 is preferably adapted to move one sign panel from one window 11 to the next window below. In this way, through the intermittent operation of the apparatus the sign will be intermittently and progressively displayed.

Various changes may be resorted to provided they fall within the spirit and scope of the invention.

I claim as my invention:—

1. A device of the class described having a drum, a disk rotatable relatively to the drum, spring means connected to the disk and drum adapted to be tensioned through turning of the disk, wind mill means exteriorly of the device operable to turn the disk, and escapement mechanism for said drum under control of said disk.

2. A device of the class described having a drum, a disk rotatable relatively to the drum, spring means connected to the disk and drum adapted to be tensioned through turning of the disk, wind mill means exteriorly of the device operable to turn the disk, escapement mechanism for said drum under control of said disk comprising a rod, a lever on said rod, a detent on said rod, a second detent, said second detent being pivoted on said rod and normally preventing rotation of the drum, means on the disk operable to displace the latter detent so that the first mentioned detent may thereupon engage the drum, and means on the disk operable against said lever to actuate the rod so that the first mentioned detent will release the drum.

3. A sign comprising an endless chain consisting of links and eyelets pivotally connecting them, a rod, a pin extending through the eyelets and mounting said rod, a sign mounting member comprising plates connected together and bulged to form a portion journaled on the rod, a sign panel, and separable fastening means between the sign panel and said mounting member.

In testimony whereof I affix my signature.

GRANVILLE F. GIBSON.